US008394977B2

(12) United States Patent
Tiefenbruck et al.

(10) Patent No.: US 8,394,977 B2
(45) Date of Patent: Mar. 12, 2013

(54) PROCESS FOR THE SURFACE MODIFICATION OF PARTICLES

(75) Inventors: Grant F. Tiefenbruck, Cottage Grove, MN (US); Matthew N. Archibald, St. Paul, MN (US); James M. Nelson, Woodbury, MN (US); Wendy L. Thompson, Roseville, MN (US); William J. Schultz, North Oaks, MN (US); Peter D. Condo, Lake Elmo, MN (US); Brant U. Kolb, Afton, MN (US); Jimmie R. Baran, Jr., Prescott, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 314 days.

(21) Appl. No.: 12/933,741

(22) PCT Filed: Mar. 26, 2009

(86) PCT No.: PCT/US2009/038367
§ 371 (c)(1),
(2), (4) Date: Sep. 21, 2010

(87) PCT Pub. No.: WO2009/120846
PCT Pub. Date: Oct. 1, 2009

(65) Prior Publication Data
US 2011/0021797 A1   Jan. 27, 2011

Related U.S. Application Data

(60) Provisional application No. 61/040,338, filed on Mar. 28, 2008.

(51) Int. Cl.
*C07F 7/00* (2006.01)
(52) U.S. Cl. ............ 556/9; 556/173; 556/466; 977/774; 977/896

(58) Field of Classification Search ............... 556/9, 173, 556/466; 977/774, 896
See application file for complete search history.

(56) References Cited

U.S. PATENT DOCUMENTS

| | | | |
|---|---|---|---|
| 2,801,185 | A | 5/1952 | Iler |
| 3,018,262 | A | 1/1962 | Schroeder |
| 3,298,998 | A | 1/1967 | McConnell |
| 3,562,223 | A | 2/1971 | Bargain |
| 3,627,780 | A | 12/1971 | Bonnard |
| 3,839,358 | A | 10/1974 | Bargain |
| 4,076,550 | A | 2/1978 | Thurn |
| 4,100,140 | A | 7/1978 | Zahir |
| 4,157,360 | A | 6/1979 | Prevorsek |
| 4,468,497 | A | 8/1984 | Street |
| 4,522,958 | A | 6/1985 | Das |
| 5,453,262 | A | 9/1995 | Dawson |

(Continued)

FOREIGN PATENT DOCUMENTS

| | | |
|---|---|---|
| CN | 1312228 | 10/2002 |
| EP | 0 452 711 | 10/1991 |

(Continued)

OTHER PUBLICATIONS

Adschiri et al., *J. Am. Ceram. Soc.*, 75 (4), 1019-1022 (1992).

(Continued)

*Primary Examiner* — Porfirio Nazario Gonzalez

(57) ABSTRACT

A method for the preparation of functionalized particles includes providing a feedstock that includes particles, a surface treatment agent reactive with the particles and solvent. The feedstock is direct through a continuous hydrothermal reactor maintained at a temperature sufficient to react the particles with the surface treatment agents to thereby provide functionalized particles. The method of the invention is capable of providing the functionalized particles in less than about 4 hours.

40 Claims, 1 Drawing Sheet

U.S. PATENT DOCUMENTS

| | | | |
|---|---|---|---|
| 5,648,407 | A | 7/1997 | Goetz |
| 6,713,534 | B2 | 3/2004 | Goerl |
| 7,033,975 | B2 | 4/2006 | Baran |
| 7,241,437 | B2 | 7/2007 | Davidson |
| 2002/0055580 | A1 | 5/2002 | Lorah |
| 2003/0035756 | A1 | 2/2003 | Nelson |
| 2003/0220204 | A1 | 11/2003 | Baran |
| 2004/0138343 | A1 | 7/2004 | Campbell et al. |
| 2005/0063898 | A1 | 3/2005 | Chisholm |
| 2006/0135669 | A1 | 6/2006 | Ryang |
| 2006/0148950 | A1 | 7/2006 | Davidson |
| 2007/0003463 | A1 | 1/2007 | Ajiri |
| 2007/0032560 | A1 | 2/2007 | Suemura |
| 2007/0098990 | A1 | 5/2007 | Cook |
| 2010/0267881 | A1 | 10/2010 | Tiefenbruck |

FOREIGN PATENT DOCUMENTS

| | | |
|---|---|---|
| JP | 2003-286306 | 10/2003 |
| JP | 2004-051681 | 2/2004 |
| JP | 2004-331883 | 11/2004 |
| KR | 10-2007-0098781 | 10/2007 |
| WO | 01/21715 | 3/2001 |
| WO | WO 2004/113455 | 12/2004 |
| WO | WO 2005/080498 | 9/2005 |
| WO | WO 2006/063317 | 6/2006 |
| WO | WO 2007/024838 | 3/2007 |
| WO | WO 2007/031775 | 3/2007 |
| WO | WO 2007/119993 | 10/2007 |
| WO | WO 2008/027979 | 3/2008 |
| WO | WO 2009/110945 | 9/2009 |
| WO | WO 2009/120868 | 10/2009 |
| WO | WO 2009/131910 | 10/2009 |
| WO | WO 2010/080459 | 7/2010 |

OTHER PUBLICATIONS

Epoxy Resins, Chemistry and Technology, Second Edition, edited by C. May, Marcel Dekker, Inc., New York (1988).

Handbook of Epoxy Resins by Lee and Neville, McGraw-Hill Book Co., New York (1967).

Handbook of Thermoset Plastics (Second Edition), William Andrew Publishing, p. 122 (1998).

Iler, The Chemistry of Silica, John Wiley & Sons, New York (1979).

Schmidt, et al., "Fabrication of agglomerate-free nanopowders by hydrothermal chemical processing", *Mater. Res. Soc. Symp. Proc.*, vol. 520, Warrendale, PA pp. 21-31 (1998).

Adachi et al, "Novel Synthesis of Submicrometer Silica Spheres in Non-alcoholic Solvent Microwave-assisted Sol-Gel Method", Sep. 2004, Chemistry Letters, vol. 33, No. 11, pp. 1504-1505.

Kappe et al, "Microwaves in Organic and Medicinal Chemistry", 2005, Wiley VCH, pp. 39-40.

Paulus et al., "Scale up of Microwave Assisted Polymerizations in Continuous Flow Mode", Feb 21, 2007, Macromolecular Rapid Communications, 2007. 28, pp. 484-491.

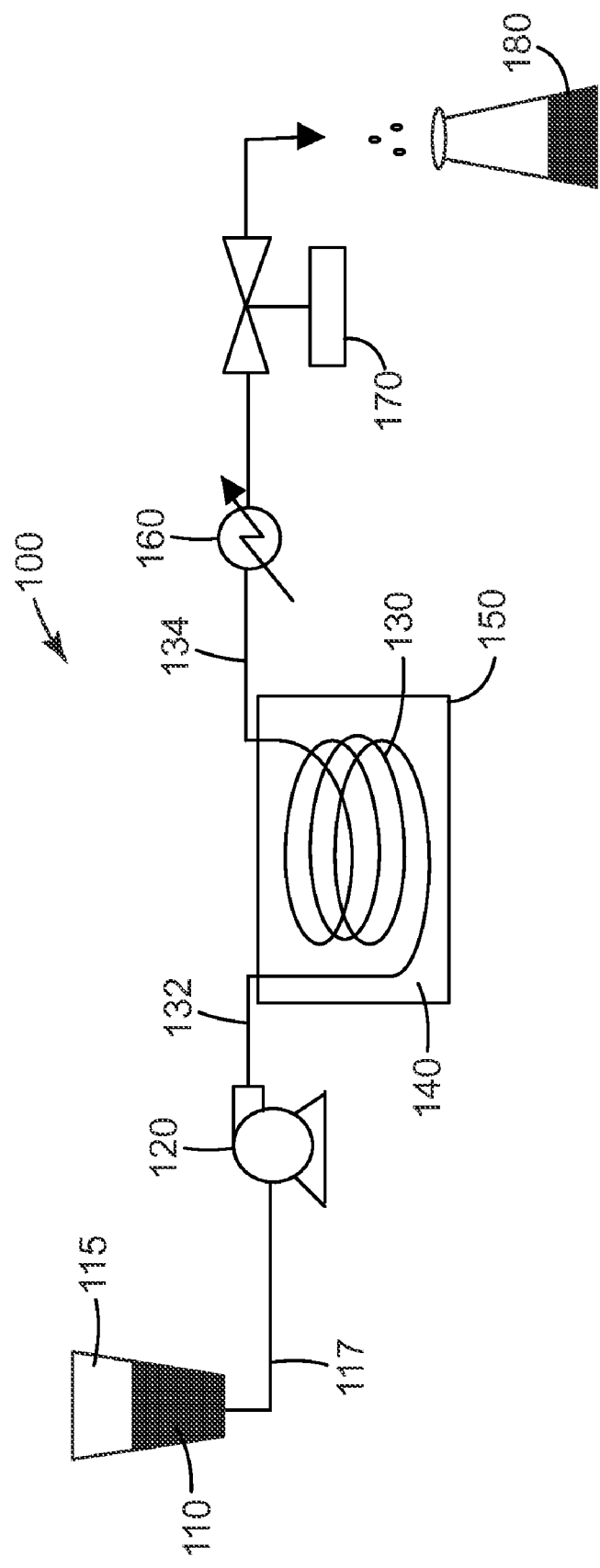

PROCESS FOR THE SURFACE MODIFICATION OF PARTICLES

CROSS-REFERENCE TO RELATED APPLICATIONS

This application was filed under 35 U.S.C. 371 as a National Stage of International Application No. PCT/US 09/38367, filed Mar. 26, 2009, which claims benefit of U.S. Provisional Application No. 61/040,338, filed Mar. 28, 2008.

The present invention relates to a method for the preparation of functionalized particles.

BACKGROUND

Composite materials incorporating certain particles such as metal oxide particles, for example, can be useful if the particles are compatible with surrounding matrix materials, usually organic polymers. One technique to achieve compatibility is by the chemical modification of the surface of the particle.

Techniques for accomplishing the surface modification of particles are known. For example, hydrolyzed alkoxysilane can be reacted with hydroxyl groups on the surface of metal oxide particles to provide silane functionalized particles. In batch reactor systems operated at or below the boiling point of the solvent solution (e.g., mixture of water and alcohol), these reactions can take anywhere from two hours up to about 24 hours to complete. The lengthy reaction time for this surface modification process has kept manufacturing costs high. Because of the high cost, economic uses for functionalized particles have been limited.

SUMMARY

The present invention provides a continuous process for the production of functionalized particles, including functionalized nanoparticles. In one aspect, the invention provides a method for the preparation of functionalized particles, the method comprising:

Providing a feedstock comprising
 particles,
 a surface treatment agent reactive with the particles,
 solvent; and
Directing the feedstock through a continuous hydrothermal reactor maintained at a temperature sufficient to react the particles with the surface treatment agents to provide the functionalized particles in less than about 4 hours.

Various terms used herein to describe aspects of the embodiments of the present invention will be understood to have the same meaning known to those skilled in the art. For clarification, certain terms shall be understood to have the meaning set forth herein.

"Boehmite" refers to a material that is predominantly gamma-aluminum oxy hydroxide (γ-AlOOH).

"Continuous hydrothermal" refers to a method of heating an aqueous or organic medium at a temperature above the normal boiling point of the medium at a pressure that is equal to or greater than the pressure required to prevent boiling of the medium. In a reactor employing a continuous hydrothermal method (e.g., a continuous hydrothermal reactor), feedstock is continually introduced into a heated zone and an effluent is continually removed from the heated zone.

"Organic matrix" refers to a polymeric material or a precursor (e.g., monomer or oligomer) to a polymeric material.

"Substantially symmetric particles" refers to particles that are relatively symmetric in that the length, width and height measurements are substantially the same and the average aspect ratio of such particles is approximately 1.

As used herein, the recitation of numerical ranges by endpoints includes all numbers subsumed within that range (e.g., 1 to 5 includes 1, 1.5, 2, 2.75, 3, 3.8, 4, and 5).

As included herein, the singular form of a noun that follows the indefinite article "a" or "an" is to be presumed to encompass the plural form of the noun unless the context clearly dictates otherwise.

Unless otherwise indicated, all numbers expressing quantities or ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present disclosure. At the very least, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains errors necessarily resulting from the standard deviations found in their respective testing measurements.

BRIEF DESCRIPTION OF THE FIGURES

In describing embodiments of the invention, reference is made to the Figures in which components of the embodiments are identified with reference numerals and wherein like reference numerals indicate like components, and wherein:

FIG. 1 is a schematic of a continuous hydrothermal reactor system for use in the process of the present invention.

Those skilled in the art will understand the features of the invention upon further consideration of the embodiments described in the remainder of disclosure including the Detailed Description, the Examples and the appended claims.

DETAILED DESCRIPTION

The present invention provides a process for the preparation of functionalized particles using one or more surface treatment agent(s) reactive with functional groups on the surface of untreated particles. By "reactive," it is meant that the surface treatment agent(s) interact with functional groups on the surfaces of untreated particles either through covalent bonding, ionic bonding, hydrogen bonding or the like. The process of the invention facilitates the rapid processing of reactants in a continuous hydrothermal reactor system maintained at a pressure and temperature sufficient to rapidly react the particles with the surface treatment agent(s) to provide functionalized particles, including microparticles and nanoparticles, in a shortened period of time as compared with prior synthetic approaches for the surface treatment of particles. In some embodiments of the invention, the particles are substantially symmetric microparticles or nanoparticles. By way of example, substantially symmetric particles include those that are substantially spherical, substantially cubic, or the like. In other embodiments, the particles useful in the invention are not symmetric in all three spatial measurements. Such asymmetric particles may be, for example, needle-like or oblong in that individual particles comprise a longitudinal axis and a lateral axis, the longitudinal axis being longer than the lateral axis. Stated another way, substantially symmetric particles typically display a length, width and height that are substantially equal while asymmetric particles have at lease one spatial measurement that is greater or less than the other two.

The process of the present invention provides functionalized particles, in some embodiments functionalized nanoparticles, more rapidly than in commonly used batch reactors operated at ambient pressure. Functionalized particles resulting from the process of the invention may be incorporated into composite materials used, for example, as abrasion resistant coatings, high refractive index coatings, or coatings which resist the effects of ultraviolet radiation. Moreover, the process of the invention facilitates rapid reaction rates, improved control of the reaction, the potential for high throughput, and a lowered labor requirement due to the rapid and continuous nature of the process. As a result, the process of the invention provides a means for lowering manufacturing costs associated with the preparation of functionalized particles, in some embodiments functionalized nanoparticles, for use in any of a variety of composite materials including, by way of example, fiberglass resin composites and optical quality films.

Starting materials for the process of the invention are initially gathered and mixed in a feedstock comprising unreacted particles, a solvent and one or more surface treatment agent(s). In an aqueous medium (e.g., water is the principal solvent) unreacted particles form a hydrosol to which the surface treatment agent is added. Optionally, co-solvent is included in the formulation of an aqueous feedstock when needed to compatibilize the surface treatment agent(s) with the aqueous sol. In some embodiments, the particles are dispersed into a hydrosol (where water serves as the principal solvent). In some embodiments, the particles are dispersed into an organosol (where organic solvent(s) is used). In still other embodiments, the particles are dispersed into mixed sols (where the liquid medium comprises both water and an organic liquid).

In the formulation of a sol, the unreacted particles are added to solvent. In embodiments of the invention, the particles are relatively uniform in size and non-aggregating when included in a sol. However, useful particles may be any of a variety of sizes depending on the desired use of the final functionalized product. In some embodiments, the particles are microparticles in that they have an average thickness of one micrometer or greater. In some embodiments, the particles have an average thickness up to about 30 micrometers. In some embodiments, the particles are nanoparticles in that they have an average thickness (e.g., length, width or height) of less than about one micrometer, in some embodiments less than about 500 nm, in some embodiments less than about 100 nm, and in some embodiments less than about 50 nm. In some embodiments, the particles have an average thickness of less than about 10 nm.

In some embodiments, the particles are asymmetric. Such asymmetric particles may be microparticles. In some embodiments, the asymmetric particles may be nanoparticles. In some embodiments, asymmetric nanoparticles can be acicular nanoparticles having an average length no greater than 1000 nanometers but typically at least 3 nanometers. In some embodiments, acicular particles can have an average length in the range of 5 to 1000 nanometers, in some embodiments in the range of 5 to 500 nanometers. In some embodiments, acicular particles can have a length in the range of 10 to 500 nanometers, in the range of 10 to 400 nanometers, in the range of 10 to 200 nanometers, in the range of 10 to 100 nanometers, or the like. In some embodiments, acicular nanoparticles have an average width that is typically no greater than 20 nanometers, no greater than 15 nanometers, no greater than 12 nanometers, no greater than 10 nanometers, no greater than 8 nanometers, no greater than 6 nanometers, or no greater than 5 nanometers. The average width, for example, can be in the range of 1 to 20 nanometers, in the range of 1 to 15 nanometers, in the range of 1 to 10 nanometers, in the range of 2 to 10 nanometers, or the like.

The unreacted particles can comprise any of a variety of materials. In some embodiments the particles comprise organic materials, and in other embodiments the particles comprise inorganic materials. In embodiments of the invention, the particles may be selected from broad categories of inorganic materials that include without limitation metals, inorganic oxides, inorganic sulfides, inorganic antimonides, inorganic salts, inorganic nitrides, metallic particles, metal coated particles, for example. Suitable organic materials include carbon black and organic pigments, for example. Inorganic pigments may also be used.

In embodiments of the invention utilizing inorganic particles, the particles may include metal particles such as, for example, particles of gold, platinum, silver, nickel and combinations of two or more of the foregoing.

In some embodiments, organic particles such as carbon black and organic pigments are useful in the process of the invention. Inorganic pigments may also be used such as red iron oxide, yellow 763ED (Pb chromate), green Co (Al, Cr)$_2$O$_4$, sodium alumino sulphosilicate (ultramarine blue), strontium carbonate, zinc phosphate, magnesium carbonate hydroxide and combinations of two or more of the foregoing.

Inorganic oxides may be suitable for use in the process of the invention. Suitable oxides include zirconia, aluminum oxide, titanium dioxide, iron oxide, zinc oxide, silicon dioxide (silica) antimony trioxide, boron oxide, boron suboxide, bismuth(III) oxide, copper(I) oxide, copper(II) oxide, chromium(III) oxide, iron(II) oxide, iron (III) oxide, magnesium oxide—MgO, manganese(IV) oxide (manganese dioxide—MnO$_2$).

In some embodiments, suitable particles include particles of inorganic sulfides which can include without limitation copper(I) sulfide—Cu$_2$S, copper(II) sulfide—CuS and zinc sulfide—ZnS. In some embodiments, suitable particles include particles of indium phosphide, aluminum phosphide, brass, metal coated glass, boron carbide—B$_4$C, boron nitride—BN, calcium carbide—CaC$_2$, calcium hydroxide, copper(II) hydroxide, lithium hydroxide, magnesium hydroxide, aluminum, aluminum hydroxide, aluminum sulfate, calcium sulfate, cobalt(II) carbonate, copper(II) carbonate, copper(II) nitrate, copper(II) sulfate, lithium carbonate, lithium nitrate—LiNO$_3$, lithium sulfate—Li$_2$SO$_4$, magnesium carbonate—MgCO$_3$, magnesium phosphate—Mg$_3$(PO$_4$)$_2$, magnesium sulfate—MgSO$_4$, manganese(II) sulfate monohydrate—MnSO$_4$.H$_2$O, manganese(II) phosphate—Mn$_3$(PO$_4$)$_2$, nickel(II) carbonate—NiCO$_3$, nickel(II) hydroxide—Ni(OH)$_2$, nickel(II) nitrate—Ni(NO$_3$)$_2$, silicon dioxide—SiO$_2$, titanium dioxide (titanium(IV) oxide)—TiO$_2$, zinc carbonate—ZnCO$_3$, zinc oxide—ZnO, zinc sulfate—ZnSO$_4$.

Combinations of any two or more of the foregoing particulate materials are contemplated within the scope of the present invention.

In certain embodiments of the invention, the unreacted particles comprise silicon dioxide (SiO$_2$ or "silica"). Suitable silicon dioxide particles can be nanoparticles or as microparticles. In some embodiments, silicon dioxide particles are solid particles (e.g., not hollow). In some embodiments, silicon dioxide particles can be hollow glass microspheres. In other embodiments, silicon dioxide particles can be solid (e.g., not hollow) glass beads. In some embodiments, colloidal silica is preferred. Other colloidal metal oxides can be utilized such as colloidal titania, colloidal alumina, colloidal zirconia, colloidal vanadia, colloidal chromia, colloidal iron oxide, colloidal antimony oxide, colloidal tin oxide, and mixtures of two or more of the foregoing. Suitable colloidal particles can comprise a single oxide such as silica, or they can comprise a core of an oxide of one type over which is deposited an oxide of another type. In some embodiments, a suitable colloidal particle comprises a core of a material other than a metal oxide over which is deposited a metal oxide.

Colloidal microparticles or nanoparticles are preferably relatively uniform in size and remain substantially non-aggregated in order to avoid aggregation, precipitation, gellation, or a dramatic increase in sol viscosity. In some embodiments, a particularly desirable class of particles for use in the invention includes sols of inorganic particles (e.g., colloidal dispersions of inorganic particles in liquid media), especially sols of amorphous silica. Such sols can be prepared by a variety of techniques and in a variety of forms which include hydrosols (where water serves as the liquid medium), organosols (where organic liquids are used), and mixed sols (where the liquid medium comprises both water and an organic liquid). See, e.g., U.S. Pat. Nos. 2,801,185 (Iler) and 4,522,958 (Das et al.), the disclosures of which are incorporated in their entireties herein by reference thereto. See also, R. K. Iler in The Chemistry of Silica, John Wiley & Sons, New York (1979).

Suitable silica hydrosols are commercially available in a variety of particle sizes and concentrations such as those available from Ondeo Nalco Chemical Company of Naperville, Ill. under the trade designations "Nalco 2329" and "Nalco 2327." Another source of a suitable silica sol is commercially available under the trade designation "Nissan MP2040" from Nissan Chemical America Corporation of Houston, Tex. Silica hydrosols can be prepared, e.g., by partially neutralizing an aqueous solution of an alkali metal silicate with acid to a pH of about 8 or 9 (such that the resulting sodium content of the solution is less than about 1 percent by weight based on sodium oxide). Other methods of preparing silica hydrosols are known, e.g., electrodialysis, ion exchange of sodium silicate, hydrolysis of silicon compounds, and dissolution of elemental silicon.

In the present invention, a feedstock is prepared by combining particles with surface treatment agent, typically in a sol. The process of the invention provides functionalized particles that are compatible with an organic matrix material such as an organic polymer. Suitable surface treatment agents include without limitation organosilanes, organotitanates, organozirconates, organoacids, organoamines, organothiols, phosphinic acids and combinations thereof.

In applications where the particles comprise colloidal silicon dioxide, zirconium oxide, titanium dioxide, the concentration of particles in the sol is typically between about 60% and about 15% by weight, in some embodiments between 55% and 30% by weight, in some embodiments between about 35% and 45% by weight.

Additionally, mixtures of particles that greatly differ in particle size may be surface treated according to the invention. Examples of some suitable combinations of particle sizes include mixtures of particles having a thickness of about 20 nm with other larger particles such as those having a thickness of about 142 nm. Additionally, 20 nm particles may be combined with 200 nm particles, and 20 nm particles with 500 nm particles. Suitable weight ratios of the foregoing combined particle sizes can be within a wide range, in some embodiments between 1/20 and 20/1.

In embodiments of the invention, reactive groups (e.g., hydroxyl groups) on the surface of the particles are utilized to interact with surface treatment agent(s) to form functionalized particles. In certain embodiments, reactive groups (e.g., hydroxyl groups) on the surface of the particles covalently bond with surface treatment agent(s). In some embodiments, reactive groups on the surface of the particles ionically bond with surface treatment agent(s).

In embodiments of the invention utilizing oxide particles (e.g., silicon dioxide, titanium dioxide, zirconium dioxide, etc. . . . ), suitable surface treatment agents include those that are reactive with the hydroxyl groups along the surface of the particles. In some embodiments, suitable surface treatment agents include organosilanes. In some embodiments, suitable organosilanes include one organic substituent and three hydrolysable substituents. Exemplary organosilanes include: [2-(3-cyclohexenyl)ethyl]trimethoxysilane, trimethoxy(7-octen-1-yl) silane, isooctyl trimethoxy-silane, N-(3-triethoxysilylpropyl)methoxyethoxyethoxyethyl carbamate, N-(3-triethoxysilylpropyl)methoxyethoxyethoxyethyl carbamate, 3-(methacryloyloxy)propyltrimethoxysilane, allyl trimethoxysilane, 3-acryloxypropyltrimethoxysilane, 3-(methacryloyloxy)propyltriethoxysilane, 3-(methacryloyloxy)propylmethyldimethoxysilane, 3-acryloyloxypropyl)methyldimethoxysilane, -9-3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, isooctyltrimethoxysilane octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, Heptamethyl(2-[tris(2-methoxyethoxy)silyl]ethyl)trisiloxane (as described in US 20030220204) polydimethylsiloxane, arylsilanes, including, e.g., substituted and unsubstituted arylsilanes, alkylsilanes, including, e.g., substituted and unsubstituted alkyl silanes, including, e.g., methoxy and hydroxy substituted alkyl silanes, and combinations of two or more of the foregoing.

Suitable surface treatments for silica particles that are to be utilized in polyurethane environments can be produced by reaction of suitable di or trifunctional polyols with 3-triethoxysilyl propyl isocyanate, resulting in urethane linkages. Suitable polyols include polyethylene glycol, polypropylene glycol, polycaprolactone polyol (Tone 2221, available from Dow Chemical, Midland Mich.), DESMOPHEN polyester resin polyol (Bayer MaterialScience, Pittsburgh, Pa.) and hydroxyl-terminated polybutadienes and poly(tetramethylene ether) glycol, for example.

Other surface treatment agents suitable for use with oxide particles include acrylic acid, methacrylic acid, oleic acid, stearic acid, dodecanoic acid, 2-[2-(2-methoxyethoxy)ethoxy]acetic acid (MEEAA), betacarboxyethylacrylate, 2-(2-methoxyethoxy)acetic acid, methoxyphenyl acetic acid, and combinations of two or more of the foregoing. In some embodiments, a proprietary silane surface modifier identified by the trade name "Silquest A1230" (commercially available from Momentive Specialties of Wilton, Conn.), may be used.

In some embodiments, suitable surface treatment agents include alkyl amines and/or aryl amines. In certain embodiments, surface treatment agents comprising $C_1$-$C_{30}$ alkyl and aryl amines may be used, particularly polyethylene glycol-functional amines (e.g., jeffamine materials), stearyl amine, behenyl amine, and combinations thereof. In other embodiments, suitable surface treatment agents include those comprising thiols and, in particular, $C_1$-$C_{30}$ alkyl and aryl thiols. In other embodiments, surface treatment agents comprising carboxylic acids may be desired, particularly those comprising $C_1$-$C_{30}$ alkyl and aryl carboxylic acids. In still other embodiments, surface treatment agents comprising phosphinic acids may be desired, particularly those comprising $C_1$-$C_{30}$ alkyl and aryl phosphinic acids.

In embodiments wherein water is used as the principal solvent, organic co-solvent may optionally be added to the sol to facilitate the solubility of the surface treatment agent as well as the functionalized particles. Suitable co-solvents comprise any of a variety of water miscible organic solvents. In some embodiments, co-solvent(s) may be selected from the group that includes, for example, 1-methoxy-2-propanol, ethanol, isopropanol, ethylene glycol, N,N-dimethylacetamide, ethyl acetate, and/or 1-methyl-2-pyrrolidinone, dimethyl formamide, diethylene glycol dimethyl ether (diglyme), methanol, methoxy(ethoxy(ethoxy))ethanol as well as mixtures of two or more of the foregoing.

Carbonaceous particles such as carbon black may be surface treated in solvents such as toluene, benzene or ethyl benzene. In some embodiments, particle concentrations for such carbonaceous particles is within the range from about 5% to about 25 wt % with surface treatment loadings from about 0.05% to about 0.1 wt %. In some embodiments, surface treatment agents are selected from zirconates, titanates and organic aryl/alkylamines as well as combinations thereof.

Once prepared, feedstock is passed through a continuous hydrothermal reactor. Known designs of continuous hydrothermal reactors can be used in the process of the invention. Suitable continuous hydrothermal reactors are described in an article by Adschiri et al., *J. Am. Ceram. Soc.*, 75 (4), 1019-1022 (1992) and in U.S. Pat. No. 5,453,262 (Dawson et al). In these designs, the portion of the continuous hydrothermal reactor system that is heated includes a tube that is straight and that has a surrounding electrical-resistance heater.

Referring now to the FIGURES, a continuous hydrothermal reactor system 100 is shown schematically in FIG. 1. Feedstock 110 comprises the surface treatment agent(s), particles (e.g., colloidal silica nanoparticles) in a sol. Feedstock 110 is mixed and placed within tank 115. The tank 115 is connected with tubing or piping 117 to pump 120. Similar tubing or piping can be used to connect other components of the reactor system 100. Tubing or piping 117 can be constructed of any suitable (e.g., non-reactive) material such as polymeric materials or ceramic materials, for example. In some embodiments, the tubing or piping 117 can be polyethylene tubing or polypropylene tubing in the portions of the continuous hydrothermal reactor system 100 that are not heated and that are not under high pressure. Pump 120 is used to pump the feedstock 110 from tank 115 through tubing or piping 117 into the inlet 132 of tubular reactor 130. Any type of pump 120 can be used that is capable of pumping against the pressure within the tubular reactor 130. The flow of feedstock 110 into the tubular reactor 130, is controlled by pump 120 and may be at a constant flow rate or it can be can be at a non-constant or pulsed flow rate.

As used herein, the term "tubular reactor" refers to the portion of the continuous hydrothermal reactor system that is heated (i.e., the heated zone). Although tubular reactor 130 is shown in FIG. 1 as a coil of tubing, it will be appreciated that the tubular reactor can have any suitable shape. The shape of the tubular reactor is often selected based on the desired length of the tubular reactor and the method used to heat the tubular reactor. For example, the tubular reactor can be straight, U-shaped, or coiled. The interior portion of the tubular reactor can be empty or can contain baffles, balls, or other known means for mixing components that are passed therethrough.

As shown in FIG. 1, the tubular reactor 130 is placed in a heating medium 140 within a heating vessel 150. The heating medium 140 can be, for example, an oil, sand or the like that can be heated to a substantially elevated temperature. In some embodiments, the heating medium is heated to a temperature above the hydrolysis and condensation temperatures of the surface treatment agent (e.g., organosilanes). Suitable oils include, for example, plant oils such as peanut oil and canola oil. Some plant oils are preferably kept under nitrogen when heated to prevent or minimize oxidation of the oils. Other suitable oils include polydimethylsiloxanes such as those commercially available from Duratherm Extended Fluids (Lewiston, N.Y.) under the trade designation "DURATHERM S." The heating vessel 150 can be any suitable container that can hold the heating medium and withstand the heating temperatures used for the tubular reactor 130. The heating vessel 150 can be heated using any suitable means. In many embodiments, the heating vessel 150 is positioned inside an electrically heated coil (not shown). Alternatively, other types of heaters such as, for example, induction heaters, fuel-fired heaters, heating tape, and steam coils can be used in place of the heating vessel 150, the heating medium 140, or both.

The tubular reactor 130 can be made of any material capable of withstanding the temperatures and pressures used to prepare functionalized particles. The tubular reactor 130 preferably is constructed of a material that is resistant to damage when exposed to reaction conditions of the surface treatment reaction. For example, when organoacids are used as surface treatment agents, carboxylic acids can be present in the feedstock or can be produced as a reaction byproduct within the continuous hydrothermal reactor system, and the tubular reactor should be resistant to corrosion or other damage in the presence of such acids. In some exemplary embodiments, the tubular reactor is made of stainless steel, nickel, titanium, carbon-based steel, or the like.

In embodiments of the invention, the heating medium 140 maintains the feedstock in the tubular reactor 130 at a temperature above the normal boiling point of the solvent used in the feedstock at a pressure that is equal to or greater than the pressure required to prevent boiling of the medium. Feedstock is continually introduced into a heated zone of the tubular reactor 130 and an effluent is continually removed from the heated zone of the tubular reactor. The introduction of the feedstock and removal of the effluent can be constant or intermittent (e.g., pulsed).

In embodiments, an interior surface of the tubular reactor 130 contains a fluorinated polymeric material which can include, for example, a fluorinated polyolefin. In some embodiments, the polymeric material is polytetrafluoroethylene ("PTFE") such as TEFLON, which is a trade designation of DuPont (Wilmington, Del.). Some tubular reactors have a fluorinated polymeric hose, such as a hose comprised of PTFE, contained within a metal housing such as a braided stainless steel housing. Heat transfer through the fluorinated polymeric material is sufficient to convert the particles and surface treatment agent(s) in the feedstock to functionalized particles under continuous hydrothermal conditions. The fluorinated polymeric surface is particularly advantageous for use with feedstock solutions and/or reaction products that contain carboxylic acids which can leach metals from hydrothermal reactors such as those constructed of stainless steel, for example.

The second end 134 of tubular reactor 130 connects to a suitable cooling device 160. In some embodiments, the cooling device 160 is a heat exchanger that includes a section of tubing or piping with an outer jacket filled with a cooling medium. In other embodiments, the cooling device 160 includes a coiled section of tubing or piping that is placed in a vessel that contains cooling water. In either of these embodiments, the reactor effluent is passed through the section of tubing and is cooled from the temperature of tubular reactor 130 to a temperature no greater than 100° C., no greater than 80° C., no greater than 60° C., no greater than 40° C. or no greater than 25° C. In some embodiments, the section of tubing and is cooled from the tubular reactor temperature to a temperature no greater than 10° C. Other cooling devices that contain dry ice or refrigeration coils can also be used. After cooling, the reactor effluent can be discharged into a product collection vessel 180. Effluent from tubular reactor 130 is preferably not cooled below its freezing point prior to being discharged into vessel 180.

The pressure inside the tubular reactor can be at least partially controlled with a backpressure valve 170, which is generally positioned between the cooling device 160 and the sample collection vessel 180. The backpressure valve 170 controls the pressure at the exit of the continuous hydrothermal reactor system 100 and helps to control the pressure within the tubular reactor 130. The backpressure is often at least 100 pounds per square inch (0.7 MPa), at least 200 pounds per square inch (1.4 MPa), at least 300 pounds per square inch (2.1 MPa), at least 400 pounds per square inch (2.8 MPa), at least 500 pounds per square inch (3.5 MPa), at least 600 pounds per square inch (4.2 MPa), or at least 700 pounds per square inch (4.9 MPa). In some embodiments, the backpressure is greater than about 700 pounds per square inch (4.9 MPa). The backpressure should be high enough to prevent boiling within the tubular reactor 130.

The dimensions of the tubular reactor 130 can be varied and, in conjunction with the flow rate of the feedstock, can be selected to provide suitable residence times for the reactants within the tubular reactor. As used herein, the term "residence time" refers to the average length of time that the feedstock is within the heated zone of the continuous hydrothermal reactor system. That is, the residence time is the average time the feedstock is within the tubular reactor 130 and is equal to the tubular reactor volume divided by the flow rate of the feedstock. Any suitable length tubular reactor can be used provided that the residence time is sufficient to convert the feedstock to functionalized particles. The tubular reactor often has a length of at least 0.5 meter, at least 1 meter, at least 2 meters, at least 5 meters, at least 10 meters, at least 15 meters, at least 20 meters, at least 30 meters, at least 40 meters, or at least 50 meters. The length of the tubular reactor in some embodiments is less than 1000 meters, less than 500 meters, less than 400 meters, less than 300 meters, less than 200 meters, less than 100 meters, less than 80 meters, less than 60 meters, less than 40 meters, or less than 20 meters.

Tubular reactors with a relatively small inner diameter are typically preferred. For example, tubular reactors having an inner diameter no greater than about 3 centimeters are often used because a relatively fast rate of heating of the feedstock can be achieved with these reactors. Also, the temperature gradient across the tubular reactor 130 is smaller for reactors with a smaller inner diameter compared to those with a larger inner diameter. However, if the inner diameter of the tubular reactor 130 is too small, there is an increased likelihood of the reactor becoming plugged or partially plugged during operation resulting from deposition of material on the walls of the reactor. The inner diameter of the tubular reactor 130 is often at least 0.1 centimeters, at least 0.15 centimeters, at least 0.2 centimeters, at least 0.3 centimeters, at least 0.4 centimeters, at least 0.5 centimeters, or at least 0.6 centimeters. In some embodiments, the diameter of the tubular reactor 130 is no greater than 3 centimeters, no greater than 2.5 centimeters, no greater than 2 centimeters, no greater than 1.5 centimeters, or no greater than 1.0 centimeters. Some tubular reactors have an inner diameter in the range of 0.1 to 3.0 centimeters, in the range of 0.2 to 2.5 centimeters, in the range of 0.3 to 2 centimeters, in the range of 0.3 to 1.5 centimeters, or in the range of 0.3 to 1 centimeter.

Rather than increasing the inner diameter of the tubular reactor 130, it may be preferable to use multiple tubular reactors having a smaller inner diameter arranged in a parallel manner. For example, rather than increasing the inner diameter of the tubular reactor 130 to produce a larger amount of functionalized particles, multiple tubular reactors having an inner diameter no greater than about 3 centimeters can be operated in parallel.

Tubular reactor 130, can be broken into two or more sections of tubing having different inner diameters and made of different materials. For example, a first section of tubing could be of smaller diameter relative to a second section to facilitate faster heating of the feedstock solution in the smaller diameter tubing prior to being held at the process temperature in the second section. In one embodiment, the first section of the tubular reactor 130 can be made of stainless steel tubing having an inner diameter of 1 centimeter, and the second section could be made of PTFE tubing contained within stainless steel housing and having an inner diameter of 2 centimeters.

Any suitable flow rate of the feedstock through the tubular reactor can be used as long as the residence time is sufficiently long to convert the feedstock to functionalized particles. Higher flow rates are desirable for increasing throughput and minimizing the deposition of materials on the walls of the tubular reactor. The flow rate is often selected based on the residence time needed to convert the feedstock to functionalized particles. A higher flow rate can often be used when the length of the tubular reactor is increased or when both the length and diameter of the tubular reactor are increased. The flow through the tubular reactor can be either laminar or turbulent.

In embodiments of the invention, the tubular reactor is held at a temperature that is greater than the hydrolysis and condensation reaction temperatures of the surface treatment agent(s). The temperature is often at least 130° C., at least 140° C., or at least 150° C. If the temperature is too high, the pressure of the tubular reactor may be unacceptably high. The temperature is typically no greater than 230° C., no greater then 225° C., or no greater than 220° C. In many embodiments, the reaction temperature is selected to be in the range of 130° C. to 230° C., in the range of 140° C. to 220° C., in the range of 140° C. to 200° C., in the range of 150° C. to 200° C., or in the range of 150° C. to 180° C.

The residence time in the tubular reactor can be varied by altering the length of the tubular reactor as well as by altering the flow rate of the feedstock solution. In many embodiments, the residence time is at least 2 minutes, at least 4 minutes, at least 6 minutes, at least 8 minutes, or at least 10 minutes. The residence time is typically no greater than 4 hours, no greater than 2 hour, no greater than 90 minutes, no greater than 60 minutes, or no greater than 50 minutes. In many embodiments, the residence time is in the range of 2 to 90 minutes, in the range of 2 to 60 minutes, in the range of 5 to 60 minutes, or in the range of 5 to 50 minutes.

In some embodiments, the hydrolysis reaction may be initiated prior to adding the surface treatment agent to a feedstock solution. Combining a hydrolyzed surface treatment agent and a particle sol enables a faster flow rate (lowered residence times) for feedstock through the reactor. Appropriate adjustments to the reactor temperature and other reaction conditions (e.g., addition of co-solvent, hydrolysis time) can help to maximize the efficiency of the surface modification reaction.

Effluent from the hydrothermal reactor comprises functionalized particles in an aqueous medium. In some embodiments, a portion of the water in the effluent may be removed prior to mixing the functionalized particles with an organic (e.g., polymer) matrix. In some embodiments, the effluent from the continuous hydrothermal reactor can be dried at a temperature suitable for removing water. Any suitable means known in the art can be used to remove at least a portion of the water. For example, methods such as vaporization, drying, and solvent exchange can be used. In some embodiments, a portion of the water may be removed from the particle sol or the feedstock before the feedstock is fed into the hydrothermal reactor. Water removal can be accomplished by diafiltration, vaporization, drying and the like.

Organic matrix can be added either before or after removal of most of the water from the treated effluent. If the organic matrix is added before removal of most of the water and the boiling point of the organic matrix is greater than the boiling point of water, the water can be removed using a method such as distillation, rotary evaporation, or oven drying.

The organic matrix typically includes a polymeric material or a precursor to a polymeric material such as a monomer or a oligomer having a polymerizable group. Any suitable technique can be used to combine the functionalized particles with the organic matrix. For example, if the organic matrix is a precursor to a polymeric material, the functionalized particles can be added prior to the polymerization reaction. If the polymeric material is a thermoplastic, the polymeric material and the functionalized particles can be combined using a process such as extrusion or Brabender mixing. The composite material containing a precursor of a polymeric material is often shaped or coated before polymerization.

Representative examples of monomers include, but are not limited to, (meth)acrylates, styrenes, epoxies, and the like. Representative examples of reactive oligomers include, but are not limited to, (meth)acrylated polyesters, (meth)acrylated polyurethanes, or acrylics. Representative examples of polymeric material include, but are not limited to, polyolefins, polyesters, polyurethanes, poly(meth)acrylates, polystyrenes, polycarbonates, and polyimides.

One exemplary process for forming a composite material includes concentrating the effluent from the hydrothermal reactor to about 40 percent solids or more using a method such as distillation or rotary evaporation, falling film evaporation, gap drying, spray drying or the like. A co-solvent and surface modification agent can be added to the concentrate. After addition of the organic matrix, the co-solvent, and water are removed. At least a portion of dissolved carboxylic acid and/or anion thereof can be removed during the concentration step or after surface modification.

The addition of the functionalized particles to an organic matrix such as a polymeric material can be advantageous. For example, the functionalized particles can be added to increase the tensile strength of a polymeric material or can be added as a thickener to an organic matrix. Because the functionalized particles can be smaller than the wavelengths of visible light, their presence in an organic matrix often cannot be detected with the unaided eye. That is, the tensile strength or thickness of an organic matrix can be increased without affecting the appearance of the organic matrix. For example, the functionalized particles can be suspended or dispersed in an organic matrix for applications where a high optical transmission is desired.

EXAMPLES

Additional embodiments of the invention are described in the following non-limiting Examples.

Procedure 1: Continuous Flow Hydrothermal Reactor (0.5 L)

A continuous flow hydrothermal reactor system similar to that shown in FIG. 1 was assembled and was used to provide functionalized particles. Feedstock was gravity fed from glass vessels to the inlet of an American Lewa Ecodos diaphragm pump and into a tubular reactor consisting of 50 feet (15.24 meters) of 0.25 inch (0.635 cm) ID Teflon tubing with a braided stainless steel exterior immersed in a temperature controlled oil bath. The pressure on the system was provided by a TESCOM backpressure regulator. Feedstock was pumped through the tubular reactor, and after spending the prescribed amount of time in the reactor (calculated from reactor volume/reactant flow rate), the reacted product was immediately cooled through 10 feet (3.05 meters) of 0.25 inch (0.635 cm) OD stainless steel tubing immersed in a cold water bath. Ashcroft pressure gauges were installed at the inlet to the reactor tube and after the outlet of the cooling coil. The product was collected in a suitable container.

Procedure 2: Continuous Flow Hydrothermal Reactor (2.9 L HTR)

A continuous flow hydrothermal reactor system similar to that shown in FIG. 1 was assembled and was used to provide functionalized particles. Feedstock was gravity fed from stainless steel vessels to the inlet of an American Lewa Ecodos diaphragm pump and into a tubular reactor consisting of 12.19 meters of 0.95 cm and 18.22 meters of 1.25 cm stainless steal tubing with ID Teflon tubing and a braided stainless steel exterior immersed in a temperature controlled oil bath. Oil is delivered and heated to the reaction vessel through use of a xxx oil heater. The pressure on the system was provided by a TESCOM backpressure regulator. Feedstock was pumped through the tubular reactor, and after spending the prescribed amount of time in the reactor (calculated from reactor volume/reactant flow rate), the reacted product was immediately cooled through a 10 foot (3.05 meters) of 1.0 inch (2.54 cm) OD stainless steel tube-in-tube heat exchanger. Ashcroft pressure gauges were installed at the inlet to the reactor tube and after the outlet of the cooling coil. The product was collected in 5-gallon HDPE pails.

Procedure 3: Continuous Flow Hydrothermal Reactor (17 L)

A continuous flow hydrothermal reactor system similar to that shown in FIG. 1 was assembled and was used to provide functionalized particles. Feedstock was gravity fed from stainless steel vessels to the inlet of an American Lewa Ecodos diaphragm pump and into a 17 liter tubular reactor consisting of 12.19 meters of 0.95 cm, 18.22 meters of 1.25 cm, and 121.92 meters of 1.25 cm stainless steal tubing with ID Teflon tubing and a braided stainless steel exterior immersed in a temperature controlled oil bath. Oil is delivered and heated to the reaction vessel through use of an oil heater. The pressure on the system was provided by a TESCOM backpressure regulator. Feedstock was pumped through the tubular reactor, and after spending the prescribed amount of time in the reactor (calculated from reactor volume/reactant flow rate), the reacted product was immediately cooled through a 10 foot (3.05 meters) of 1.0 inch (2.54 cm) OD stainless steel tube-in-tube heat exchanger. Ashcroft pressure gauges were installed at the inlet to the reactor tube and after the outlet of the cooling coil. The product was collected in 55-gallon HDPE pails.

Procedure 4: General Procedure for Fracture Toughness Testing

Fracture toughness was measured according to ASTM D 5045-99, except that a modified loading rate of 0.13 cm/minute (0.050 inches/minute) was used. A compact tension geometry was used, wherein the specimens had nominal dimensions of 3.18 cm by 3.05 cm by 0.64 cm (1.25 inches (in.) by 1.20 in. by 0.25 in.). The following parameters were employed: W=2.54 cm (1.00 in.); a=1.27 cm (0.50 in.); B=0.64 cm (0.25 in.). Measurements were made on between 6 and 10 samples for each resin tested. Average values for both $K_q$ and $K_{IC}$ were reported in units of megapascals times the square root of meters, i.e., MPa $(m^{1/2})$, along with the number of samples used and standard deviation. Only those samples meeting the validity requirements of ASTM D 5045-99 were used in the calculations.

Procedure 5: General Procedure for Barcol Hardness Testing

Barcol hardness ($H_B$) was measured according to ASTM D 2583-95 (Reapproved 2001). A Barcol Impressor (Model GYZJ-934-1, available from Barber-Colman Company, Leesburg, Va.) was used to make measurements on specimens having a nominal thickness of 0.64 cm (0.25 in.). For each sample, between 5 and 10 measurements were made and the average value was reported.

Procedure 6: General Procedure for Flexural Modulus (E') and Glass Transition Temperature (Tg) Determination Flexural storage modulus, E', was measured using an RSA2 Solids Analyzer (obtained from Rheometrics Scientific, Inc, Piscataway, N.J.) in the dual cantilever beam mode. The specimen dimensions had nominal measurements of 50 millimeters long by 6 millimeters wide by 1.5 millimeters thick. A span of 40 millimeters was employed. Two scans were run, the first having a temperature profile of: −25° C. to +125° C. and the second scan having a temperature profile of −25° C. to +150° C. Both scans employed a temperature ramp of 5° C./minute, a frequency of 1 Hertz and a strain of 0.1%. The sample was cooled after the first scan using refrigerant at an approximate rate of 20° C./minute after which the second scan was immediately run. The flexural modulus measured in MPa at +25° C. on the second scan was reported. The tan delta peak of the second scan was reported as the glass transition temperature (Tg).

The materials listed in Table 1 were used to prepare functionalized particles as described in Examples 1-20 and Comparative Examples A-F.

TABLE 1

Materials

| Abbreviation | Component and Source |
|---|---|
| A-174 | Silquest A-174, 3-Methacryloxypropyltrimethoxysilane available from Momentive, Friendly, WV. |
| HK | HK Translucent Gelcoat Base, A blend of unsaturated polyester/styrene available from HK Research Hickory, NC |
| Silica sol (Nalco 2329) | A 41% solids by weight, aqueous, silica sol with an approximate particle size of 0.10 μm, available from Ondeo Nalco Chemical Company of Naperville, Ill.. |
| Silica sol (Nalco 2326) | A 15% solids by weight, aqueous, silica sol with an approximate particle size of 5 nm, available from Ondeo Nalco Chemical Company of Naperville, Ill.. |

TABLE 1-continued

Materials

| Abbreviation | Component and Source |
|---|---|
| Silica sol (Nalco TX-13112) | A 33% solids by weight, aqueous, silica sol with an approximate particle size of 0.22 μm, available from Ondeo Nalco Chemical Company of Naperville, Ill |
| Silica sol (Nalco 2327) | A 41% solids by weight, aqueous, silica sol with an approximate particle size of 20 nm, available from Ondeo Nalco Chemical Company of Naperville, Ill.. |
| Resin blend (Hydrex 100 HF) | A blend of vinyl ester resin and styrene monomer commercially available from Reichhold, Durham, NC. |
| PhSi(OMe)3 | Phenyltrimethoxysilane commercially available from Alfa Aesar Ward Hill, MA. |
| A-1230 | Silquest A-1230, a polyethylene glycol(trimethoxy)silane available from Momentive, Friendly, WV. |
| Isopropanol | Isopropanol available from Alfa Aesar, Ward Hill, MA. |
| Ethanol | Ethanol available from Pharmco Aaper, Brookfield, CT |
| Methanol | Methanol available from Alfa Aesar, Ward Hill, MA. |
| isooctyltri-methoxysilane | available from Gelest, Morrisville, PA. |
| MpOH | 1-Methoxy-2-propanol available from Aldrich Chemicals, Milwaukee, WI. |
| Epon 825 | Bisphenol A diglycidyl ether, commercially available from Hexion Specialty Chemicals, Houston, Texas. |
| MEKP | MEK Peroxide Catalyst available from HK Research Hickory, NC |
| Cobalt Naphenate | 12% Cobalt Naphenate in styrene available from HK Research, Hickory, NC |
| Ethacure 100 | Ethacure 100 is a liquid aromatic amine, commercially available from Albermarle, Baton Rouge, LA. |
| CB | Carbon Black, Commercially Available from Cabot Corporation, Boston, MA. |
| Lica 09 | Neopentyl(diallyl)oxy tri(dodecyl)benzene-sulfonyl titanate Ken-React Titanate Coupling Agent LICA 09, commercially available from Kenrich Petrochemicals, Inc., Bayonne, NJ. |
| LICA 38 | Titanate agent (Neo-alkoxy tris[dioctylpyro-phosphato]titanate) commercially available from Kenrich Petrochemical, Bayonne, NJ. |
| GMS | 3M Scotchlite Glass Microspheres: Glass microspheres available from 3M company St. Paul, MN. |
| Au | Gold (Au) Metal & Powder commercially available from READE, East Providence, Rhode Island USA. |
| Octadecyl-amine | Commercially available from Aldrich, St. Louis, MO. |
| UB | Ultramarine blue, Sodium alumino sulphosilicate (Na8-10Al6Si6O24S2-4), such as Ultramarine blue 690 ® manufactured by Nubiola USA Inc., Norcross, GA |
| CaCO3 | Calcium carbonate powder commercially available from Reade, East Providence, Rhode Island USA. |
| mPeg-COOH | mPEG-COOH, 1k, Methoxy-PEG-Carboxylic acid, MW 1000 Da, commercially available from as PBL-282 from Creative PEGWorks Winston Salem, NC |
| NZ39 | Zirconium IV 2,2(bis-propenolato)butanolato, tris 2-propenolato-O, a zirconate commercially available from Kenrich Petrochemical, Bayonne, NJ. |
| THF | Tetrahydrofuran, commercially available from Aldrich Chemicals, Milwaukee, WI. |
| Toluene | Toluene, commercially available from Alfa Aesar, Ward Hill, MA |
| ZrO(CH3COO)2 | Zirconyl acetate commercially available from Alfa Aesar, Ward Hill, MA |
| Aluminum Powder | spherical aluminum powder commercially available from Aldrich Chemicals, Milwaukee, WI |
| Glacial acetic acid | Glacial acetic acid, 99.5% acid commercially available from EMD Chemicals, Darmstadt, Germany. |
| Formic Acid | Formic acid, 97% acid, commercially available from Alfa Aesar, Ward Hill, MA. |
| Phenylphos-phonic acid | Phenylphosphonic acid commercially available from Alfa Aesar, Ward Hill, MA. |
| Diacetone Alcohol (DAA) | 4-hydroxy-4-methyl-2-pentanone.commercially available from Aldrich Chemicals, Milwaukee, WI. |

TABLE 1-continued

Materials

| Abbreviation | Component and Source |
|---|---|
| Ethanol | 200 proof ethanol commercially available from |
| PhSi(OEt)$_3$ | Phenyltriethoxysilane commercially available from Alfa Aesar Ward Hill, MA. |
| EPON 828 | A Bisphenol A diglycidyl ether-based epoxy resin, commercially available from Hexion Specialty Chemicals, Houston Texas. |

Example 1

Zirconia particles were generated according to Examples 4-7 of U.S. Pat. No. 7,241,437 employing a Hot Tube Reactor to carry out the hydrolysis of zirconyl acetate. The output from this process was a sol that was 40% by weight zirconia particles in water. A surface treatment agent, 3-methacryloxypropyltrimethoxysilane was added to the sol along with 1-methoxy-2-propanol. Methoxypropanol (MpOH) was added to the feedstock in an amount equal to the weight of the sol that was used. The silane was added in the ratio of 10 grams of silane for every 100 grams of zirconia sol. The functionalization of the zirconia particles was carried out as described in Procedure 1. The oil bath was heated to maintain the tubular reactor at 150° C. The feedstock (zirconia, water, 1-methoxy-2-propanol, and silane) was pumped into the reactor at the rate of 10 milliliters per minute, corresponding to an average dwell time of 48 minutes within the tubular reactor, resulting in functionalized zirconia particles. The particles were dispersible in tetrahydrofuran (THF), thus providing an indication of their compatibility with organic fluids and an indirect measure of the success of the functionalization reaction.

Comparative Examples A-D

Composites were prepared for each of the Comparative Examples A-D using a conventional batch reaction system. Silica sol, silanes and methoxy propanol was mixed at 95° C. for 22 hours in standard laboratory equipment. For Comparative Examples A, B and D, the resulting surface treated silica sol was compounded into resin systems by solvent exchange and vacuum stripping of solvents according to methods described in U.S. Pat. No. 5,648,407 to Goetz et al. For Comparative Example C, the resulting surface treated silica sol was compounded into resin systems by solvent exchange and vacuum stripping of solvents according to methods described in the pending PCT patent application serial no. US 2007/077130 entitled "Resin Systems Including Reactive Surface-Modified Nanoparticles" (Goenner et al.). Samples were made by first dispersing dry surface modified SiO$_2$ into a solvent using a rotor stator mixer. The appropriate resin was then added and the solvent removed by rotary evaporation. High degrees of surface functionalization were confirmed by dispersing the particles into appropriate epoxy or vinyl esters and achieving relatively low viscosity liquids. The actual formulations for the composites of Comparative Examples A-D are set forth in Table 2.

TABLE 2

Formulations - Comparative Examples A-D

| C Ex | Particle | Particle size (nm) | Surface Treatment (mole:mole ratio) | Resin | % Solids |
|---|---|---|---|---|---|
| A | Nalco 2329 | 95 | PhSi(OMe)$_3$ | Epon 828 | 30 |
| B | Nalco 2327 | 20 | PhSi(OMe)$_3$ | Epon 825 | 25 |
| C | Nalco 2329 | 98 | A-174/ A-1230 (1:1) | HK Translucent Gelcoat Base | 42 |
| D | Nalco TX-13112 | 217 | PhSi(OMe)$_3$ | Epon 825 | 30 |

Examples 2-8

Functionalized silica particles were prepared in a continuous flow hydrothermal reactor as described in Procedures 1-3. Feedstock for Examples was prepared using a stirred aqueous dispersion of silica sol (see Table 4). Surface treatment agent (silane) was added to the sol and the resultant sol/silane mixture was stirred for 5 minutes at room temperature (23° C.). A mixture of a second surface treatment agent and co-solvent was added to the sol/silane mixture over a 5 minute period and the resulting dispersion was continuously stirred prior to delivery to the continuous reactor. Features of the reactants used in the formulation of the feedstock are set forth in Table 3. Dispersions were delivered to the continuous flow hydrothermal reactor at the flow rates and reactor temperatures described in Table 4. Examples 2, 3 and 5 illustrate the use of alcohol alternatives to methoxypropanol. Examples 5, and 6 illustrate the scaleability of this invention, employing larger diameter and longer length reactors. In the case of Example 8, the silica sol was concentrated to 62 wt % solids by diafiltration prior to mixing with methoxypropanol.

The particles were dispersible in tetrahydrofuran (THF), thus providing an indication of their compatibility with organic fluids and an indirect measure of the success of the functionalization reaction.

TABLE 3

Sol Formulations - Examples 2-8

| Ex | Silica Sol | Wt. silica sol (Kg) | MpOH (Kg) | EtOH (g) | DAA (g) | PhSi(OMe)$_3$ (g) |
|---|---|---|---|---|---|---|
| 2 | Nalco 2329 | 2.20 | | | 1298 | 17.4 |
| 3 | Nalco 2329 | 6.00 | | 3583 | | |
| 4 | Nalco 2327 | 1.10 | 0.65 | | | 55.85 |
| 5 | Nissan MP2040 | 136.36 | 81.00 | | | |
| 6 | Nalco 2329 | 49.32 | 30.87 | | | — |
| 7 | Nalco TX 13112 | 10.11 | 6.78 | | | 57.6 |
| 8 | Nalco 2329 | 1.50 | 0.86 | | | 29.7 |

TABLE 4

Process conditions for Continuous Silylation Reactions

| Ex | Residence Time (min) | Temperature (° C.) | Flowrate (ml/min) | Reactor Size (L) |
|---|---|---|---|---|
| 2 | 30.0 | 150 | 16.7 | 0.5 |
| 3 | 30.0 | 150 | 16.7 | 0.5 |

TABLE 4-continued

Process conditions for Continuous Silylation Reactions

| Ex | Residence Time (min) | Temperature (° C.) | Flowrate (ml/min) | Reactor Size (L) |
|---|---|---|---|---|
| 4 | 30.0 | 150 | 16.7 | 0.5 |
| 5 | 32.0 | 160 | 600 | 17.7 |
| 6 | 13.8 | 175 | 210 | 2.9 |
| 7 | 10.0 | 125 | 50.0 | 0.5 |
| 8 | 30.0 | 150 | 20.0 | 0.5 |

The surface-treated silica sols exemplified in Examples 2-5, 7, and 8 were compounded into resin systems by solvent exchange and vacuum stripping of solvents according to methods described in U.S. Pat. No. 5,648,407 to Goetz et al and sols synthesized in Example 6 was compounded by methods outlined in the pending PCT patent application serial no. US 2007/077130 entitled "Resin Systems Including Reactive Surface-Modified Nanoparticles" (Goenner et al.). High degrees of surface functionalization were confirmed by dispersing the particles into appropriate epoxy or vinyl ester resins and achieving relatively low viscosity liquids. The compositions of the nanocomposites are set forth in Table 5.

TABLE 5

Nanocomposites - Examples 2-8

| Ex. | Sol | Particle size (nm) | Surface Treatment (mole/mole) ratio | Resin Type | % Solids |
|---|---|---|---|---|---|
| 2 | Nalco 2329 | 95 | PhSi(OMe)$_3$ | Epon 828 | 30 |
| 3 | Nalco 2329 | 95 | PhSi(OMe)$_3$ | Epon 828 | 30 |
| 4 | Nalco 2327 | 20 | PhSi(OMe)$_3$ | Epon 828 | 25 |
| 5 | Nalco 2329 | 95 | PhSi(OEt)$_3$ | EPON 828 | 30 |
| 6 | Nalco 2329 | 98 | A-174/A-1230 (3;1) | HK | 42 |
| 7 | Nalco TX 13112 | 217 | PhSi(OMe)$_3$ | Epon 825 | 30 |
| 8 | Nalco 2329 | 95 | PhSi(OMe)$_3$ | Epon 825 | 30 |

Cured samples of examples Comparative Example A, B, D and Example 2-5 and 7-8, as well as were used to prepare specimens for physical property testing. A 1.5 stoichiometric amount of Ethacure 100 was added to the epoxy resin sol resulting in a final 30% silica concentration into a wide-mouth plastic container with a lid. The container was sealed and the contents were mixed at 2000 rpm for 30 seconds using a SpeedMixer™ dual asymmetric centrifuge (Model DAC 600 FVZ-sp, available from Flack Tek, Incorporated, Landrum, S.C.). The container was sealed and the contents mixed at 2000 rpm for 30 seconds using a SpeedMixer™. After mixing the nanoparticle-containing gel coat was transferred to a float glass mold treated with Frekote® 44NC (Henkel Corporation, Rocky Hill, Conn. release material. The sample was then allowed to cure at 110° C. for 2 hours and then postcured at 160° C. for 1.5 hours. Samples made according to Comparative Example A, B, D and Example 2-5 and 7-8, were further evaluated according to Procedure 4 (General Procedure for Fracture Toughness Testing). Data are set forth in Table 6.

TABLE 6

| Sample | $K_{IC}$ | Particle Size (nm) |
|---|---|---|
| CEx D | 1.3 | 217 |
| Ex 7 | 1.5 | 217 |
| CEx A | 1.5 | 95 |
| EX 8 | 1.5 | 95 |
| EX 2 | 1.5 | 95 |
| EX 3 | 1.5 | 95 |
| EX 5 | 1.5 | 95 |
| CEx B | 1.2 | 20 |
| Ex 4 | 1.2 | 20 |

Cured samples of examples Comparative Example D and Example 6 were used to prepare specimens for physical property testing. Into a wide-mouth plastic container having a lid was placed the resulting nanoparticle-containing gel coat and 1.25% by weight cobalt napthenate. The container was sealed and the contents were mixed at 2000 rpm for 30 seconds using a SpeedMixer™ dual asymmetric centrifuge (Model DAC 600 FVZ-sp, available from Flack Tek, Incorporated, Landrum, S.C.). 1.0% by weight of methylethylketone peroxide (MEKP) solution (ca. 35 wt. % solution) was then added. The container was sealed and the contents mixed at 2000 rpm for 30 seconds using a SpeedMixer™. After mixing the nanoparticle-containing gel coat was transferred to a float glass mold treated with VALSPAR MR 225 release material. The sample was then allowed to cure at room temperature for 24 hours and then postcured at 70° C. for 4 hours. Samples made according to Example 6 and Comparative Example C were further evaluated according to Procedure 4 (General Procedure for Fracture Toughness Testing), Procedure 5 (General Procedure for Barcol Hardness Testing) and Procedure 6 (General Procedure for Flexural Modulus (F) and Glass Transition Temperature (Tg) Determination). Data are set forth in Table 7.

TABLE 7

| Sample | $H_B$ | $K_{IC}$ | $T_g$ (° C.) 1$^{st}$ Heat | E' (MPa) @ 25° C. | $T_g$ (° C.) 2$^{nd}$ Heat | E' (MPa) @ 25° C. 2$^{nd}$ Heat | Modulus (ksi) | Failure Stress (psi) | Failure Strain (%) |
|---|---|---|---|---|---|---|---|---|---|
| CEx D | 67 | 0.75 | 124 | 6.7 | 128 | 7.4 | 825 | 9,163 | 1.3 |
| Ex 6 | 63 | 0.72 | 123 | 6.6 | 130 | 7.0 | 725 | 10,181 | 2.0 |

Examples 9-13

An aqueous mixture of particles and surface treatment agents is created at approximately 5-25 wt % solids (Table 8) and stirred at room temperature. The initial concentrations of surface treatment agents are determined based on the sizes of the particles used. The resulting mixture is pumped via use of a diaphragm pump (e.g., Lewa Ecodos series C80S model pump, American LEWA, Holliston Mass.) at various flow rates and reactor temperatures as described in Table 8. Materials are collected at the outlet of the reactor. Optionally, in the case of Example 10 it is possible to feed particle/solvent mixtures through pressure feeding mechanisms involving loading the feedstock sol into a suitable pressure rated canister and using nitrogen gas as a propellant.

The particles were dispersible in tetrahydrofuran (THF), thus providing an indication of their compatibility with organic fluids and an indirect measure of the success of the functionalization reaction.

TABLE 8

Formulation Details of Starting Sols

| Particle EX (Quantity (g)) | Methoxy-propanol/ Water (g) | Surface Treatment (Wt % relative to Particle) | Temperature Range (° C.) | Residence Time (min) | Approximate Flowrate (ml/min) |
|---|---|---|---|---|---|
| 9 CB (500) | 750/7500 | Lica 09 (0.05 to 0.1) | 125-160 | 15-30.0 | 16-33 |
| 10 GMS (100) | 950/950 | NZ39 (0.05 to 0.1) | 125-160 | 15-30.0 | 16-33 |
| 11 Au (100) | 950/950 | Octadecylamine (0.05 to 0.1) | 125-160 | 15-30.0 | 16-33 |
| 12 UB (300) | 850/850 | LICA 38 (0.05 to 0.1) | 125-160 | 15-30.0 | 16-33 |
| 13 CaCO$_3$ (500) | 750/750 | mPEG-COOH (0.05 to 0.1) | 125-160 | 15-30 | 16-33 |

Example 14

Functionalized acicular boehmite was prepared. First, untreated acicular boehmite particles were prepared from a precursor material obtained by digesting powdered aluminum in a mixture of formic acid, acetic acid, and water. 27 grams of spherical aluminum powder, 48.2 grams of glacial acetic acid, 19 grams of formic acid and 405.8 grams of water were combined in a 1000 ml round bottom flask equipped with a reflux condenser, a magnetic stirrer, and a heating mantle. The reactants were heated to about 80° C. and an exothermic reaction began, releasing heat to drive the temperature well above 80° C. After 1 to 2 hours the temperature settled back to 80° C. The temperature set point for the heating mantle was then raised to heat the reaction mixture to about 100° C. for 9 to 16 hours. The resulting reaction product was then cooled to room temperature and was filtered, first using Whatman Filter Papers #50 (Whatman International Ltd., Maidstone, England) and then by using Whatman Filter Papers #54. The resulting product solution was about 10% Al$_2$O$_3$ by weight. This solution was further diluted with an additional 1000 g of deionized water before being subsequently processed. Acicular boehmite particles were then synthesized from the foregoing solution using a Hot Tube Reactor process as described in U.S. Provisional Patent Application No. 61/017,267 (docket 62926US002) using a reactor temperature of 170° C. with an average residence time of 48 minutes.

The resulting colloidal product was tray dried in a vacuum oven at 70° C. overnight to remove excess carboxylic acids. 25 grams of the dried flakes were dispersed into 475 grams of deionized water, and 500 grams of 1-methoxy-2-propanol was added to the aqueous solution. 15 grams of phenyltrimethoxysilane was used as a surface treatment agent which was added to the mixture with vigorous stirring. The resulting solution was then pumped through the Continuous Flow Hydrothermal Reactor according to the above Proceedure 1 with the heating oil temperature set at 170° C. The average residence time in the tubular reactor was 48 minutes.

Example 15

Boehmite particles were synthesized in the manner described in Example 14. The resulting colloidal product from the hydrothermal reactor was tray dried in a vacuum oven at 70° C. overnight to remove excess carboxylic acids. Then 20 grams of the dried flakes were dispersed into 480 grams of deionized water, and 500 grams of 1-methoxy-2-propanol was added to the aqueous solution. Finally, 1.58 grams of phenylphosphonic acid was added to the mixture with vigorous stirring. The solution was pumped through the hydrothermal reactor with the oil bath temperature set at 150° C. and the average residence time of 48 minutes. The material was collected from the reactor, and 0.6 grams of the product was dispersed in THF showing compatibility with organic fluids that the untreated particles did not demonstrate.

Example 16

This Example illustrates the successful surface functionalization of very small (5 nm) SiO$_2$ nanoparticles using the hydrothermal reactor. 2000 g of Nalco 2326, a water-based SiO$_2$ sol with a nominal 15% solids by weight, was poured into a 1 gallon HDPE jug. In a separate 1 gal HDPE jug was added 3200 g of 1-methoxy-2-propanol as co-solvent. To the co-solvent was added 132.0 g of surface treatment agent, isooctyltrimethoxysilane, and mixed manually. The SiO$_2$ sol was transferred to a 5 gallon HDPE pail and pneumatic stirring was initiated. The solution of co-solvent and surface treatment agent was then poured slowly into the 5 gallon pail containing the SiO$_2$ sol. The resulting feedstock was mixed for ten minutes and flow was then initiated to the hydrothermal reactor. The backpressure regulator was maintained at 300 psig. The oil temperature for the hydrothermal reactor was maintained at 150° C. A pump was used to control the flow rate and thus residence time. A flow rate of 11 ml/min was used resulting in a residence time of 40.9 min in the 450 ml reactor. The effluent was collected in a HDPE container. A portion of the effluent was dried in a preheated 150° C. oven for 1 hour. The dried material was ground with a mortar and pestle. A solution containing 10% by weight SiO$_2$ particles in toluene was prepared in a vial. The vial containing the mixture solution was shaken vigorously. The result was a large white foam head above a clear solution free of solids, indicating that the SiO2 particles were functionalized with the isooctyltrimethoxysilane.

Example 17

This Example illustrates a hydrolysis step of the surface treatment agent and subsequent successful surface functionalization of very small (5 nm) SiO$_2$ particles via the hydrothermal reactor using 1-methoxy-2-propanol as co-solvent. 135.41 g of 1-methoxy-2-propanol as co-solvent was poured into a 32 ounce glass jar. To the co-solvent was added 68.56 g of deionized water. This was followed by 3.47 g of acetic acid, and then 34.30 g of the surface treatment agent, isooctyltrimethoxysilane. Upon sealing and shaking, the mixture phase separated into two phases with the lower density and insoluble isooctyltrimethoxylsilane as the top phase. A stir bar was added to the jar. The mixture was placed on a hot plate with stirring and heating to a temperature of about 45° C.

Initially, stirring resulted in a turbid mixture due to presence of two phases. Within about 20 minutes the mixture had become a clear, one phase solution.

To a 1 gallon HDPE jug was added 499.2 g of Nalco 2326 water-based $SiO_2$ sol. To the jug was added 671.9 g of 1-methoxy-2-propanol as co-solvent. The jug was then sealed and shaken vigorously. The Nalco 2326 and co-solvent mixture was transferred to a 5 gallon HDPE pail and pneumatic stirring initiated. The hydrolyzed surface treatment agent solution was added slowly into the 5 gallon pail. The resulting feedstock was then mixed for ten minutes and flow was initiated to the hydrothermal reactor. The backpressure regulator was maintained at 300 psig. The oil temperature for the hydrothermal reactor was maintained at 150° C. A pump was used to control the flow rate of 11 ml/min, resulting in a residence time of 40.9 min in the 450 ml reactor. The effluent was collected in a HDPE container. A portion of the effluent was dried in a preheated 150° C. oven for 1 hour. The dried material was ground with a mortar and pestle. A solution containing 10% by weight $SiO_2$ particles in toluene was prepared in a vial. The vial containing the mixture solution was shaken vigorously. The result was a large white foam head above a clear solution free of solids, indicating that the $SiO_2$ particles were functionalized with isooctyltrimethoxysilane.

Example 18

Example 18 illustrates the use of hydrolysis of the surface treatment agent and subsequent surface functionalization of very small (5 nm) $SiO_2$ particles in the hydrothermal reactor using isopropanol as co-solvent. 135.38 g of isopropanol as co-solvent was poured into a 32 ounce glass jar. To the co-solvent was added 68.50 g of deionized water. This was followed by 3.49 g of acetic acid, and then 34.31 g of isooctyltrimethoxysilane. A stir bar was added to the jar and the mixture placed on a hot plate with stirring and heating activated. The mixture was heated and stirred for about 30 minutes at a temperature of about 45° C. To a 1 gallon HDPE jug was added 502.0 g of Nalco 2326, a water-based $SiO_2$ sol. To the jug was added 285.5 g of isopropanol. The jug was then sealed and shaken vigorously. The $SiO_2$ sol and co-solvent mixture was transferred to a 5 gallon HDPE pail and pneumatic stirring was initiated. The hydrolyzed surface treatment agent solution was then poured slowly into the 5 gallon HDPE pail. This completed preparation of the feedstock mixture. The feedstock was then mixed for ten minutes and flow was initiated to the hydrothermal reactor. The backpressure regulator was maintained at 300 psig. The oil temperature for the hydrothermal reactor was maintained at 150° C. A pump was used to control the flow rate and thus residence time. A flow rate of 12 ml/min was used resulting in a residence time of 37.5 min in the 450 ml reactor. The effluent was collected in a HDPE container. A portion of the effluent was dried in a preheated 150° C. oven for 1 hour. The dried material was ground with a mortar and pestle. A solution containing 10% by weight SiO2 particles in toluene was prepared in a vial. The vial containing the mixture solution was shaken vigorously. The result was a large white foam head above a clear solution free of solids, indicating that the SiO2 particles were successfully functionalized with the isooctyltrimethoxysilane.

Example 19

Example 19 illustrates the use of hydrolysis of the surface treatment agent and subsequent successful surface functionalization of very small (5 nm) SiO2 particles via the hydrothermal reactor using a ethanol/methanol co-solvent mixture. 108.49 g of ethanol and 27.62 g of methanol were poured into a 32 ounce glass jar. To the co-solvent solution was added 68.90 g of deionized water. This was followed by 3.90 g of acetic acid, and then 34.60 g of isooctyltrimethoxysilane. A stir bar was added to the jar and the mixture placed on a hot plate with stirring and heating activated. The mixture was heated and stirred for about 2 hours and 40 minutes at a temperature of about 45° C. To a 1 gallon HDPE jug was added 501.3 g of Nalco 2326, a water-based SiO2 sol. To the jug was added 227.83 g of methanol and 56.56 g of methanol. The jug was then sealed and shaken vigorously. The Nalco 2326 and co-solvent mixture was then transferred to a 5 gallon HDPE pail and pneumatic stirring initiated. The hydrolyzed surface treatment agent solution was then poured slowly into the 5 gallon HDPE pail. This completed preparation of the feedstock mixture. The feedstock was then mixed for ten minutes and flow was initiated to the hydrothermal reactor. The backpressure regulator was maintained at 300 psig. The oil temperature for the hydrothermal reactor was maintained at 150° C. A pump was used to control the flow rate of 12 ml/min, resulting in a residence time of 37.5 min in the 450 ml reactor. The effluent was collected in a HDPE container. A portion of the effluent was dried in a preheated 150° C. oven for 1 hour. The dried material was ground with a mortar and pestle. A solution containing 10% by weight SiO2 particles in toluene was prepared in a vial. The vial containing the mixture solution was shaken vigorously. The result was a large white foam head above a clear solution free of solids, indicating that the SiO2 particles were successfully functionalized with the isooctyltrimethoxysilane.

Example 20

Example 20 illustrates the use of diafiltration to concentrate the $SiO_2$ sol; hydrolysis of the surface treatment agent; and subsequent successful surface functionalization of very small (5 nm) $SiO_2$ particles via the hydrothermal reactor using a 1-methoxy-2-propanol co-solvent. To remove water and concentrate the sol, 2000 g of Nalco 2326, a water-based $SiO_2$ sol, was flowed through a diafiltration filter (M211S-100-01P) from Spectrum Labs (Rancho Dominguez, Calif.). The weight percent solids of the sol increased from 16.6% to 28.1%. 340.6 g of 1-methoxy-2-propanol as co-solvent was poured into a 32 ounce glass jar. To the co-solvent was added 172 g of deionized water. This was followed by 8.61 g of acetic acid, and then 86.08 g of the surface treatment agent, isooctyltrimethoxysilane. Upon sealing and then shaking the mixture phase separated into two phases with the lower density and insoluble isooctyltrimethoxylsilane as the top phase. A stir bar was added to the jar. The mixture was placed on a hot plate and stirring and heating activated. The mixture reached a temperature of about 45° C. Initially, stirring resulted in a turbid mixture due to presence of two phases. Within about 20 minutes the mixture had become a clear, one phase solution. To a 1 gallon HDPE jug was added 748.9 g of the concentrated Nalco 2326, a water-based SiO2 sol. To the jug was added 373.94 g of 1-methoxy-2-propanol. The jug was then sealed and shaken vigorously. The concentrated Nalco 2326 and co-solvent mixture was transferred to a 5 gallon HDPE pail and pneumatic stirring initiated. The hydrolyzed surface treatment agent solution was then poured slowly into the gallon HDPE pail. This completed preparation of the feedstock mixture. The feedstock was then mixed for ten minutes and then flow was initiated to the hydrothermal reactor. The backpressure regulator was maintained at 300 psig. The oil temperature for the hydrothermal reactor was maintained at 150° C. A pump was used to control the flow rate and thus residence time. A flow rate of 11 ml/min was used resulting in a residence time of 40.9 min in the 450 ml reactor. The effluent was collected in a HDPE container. A portion of the effluent was dried in a preheated 150° C. oven for 1 hour. The dried material was ground with a mortar and pestle. A solution containing 10% by weight SiO2 particles in toluene was prepared in a vial. The vial containing the mixture solution was shaken vigorously. The result was a large white foam head above a clear solution free of solids, indicating that the SiO2 particles were successfully functionalized with the isooctyltrimethoxysilane.

While embodiments of the invention have been described in sufficient detail, those skilled in the art will appreciate that changes or modifications, both foreseeable and unforeseen, may be made to the described embodiments without departing from the spirit or scope of the invention.

What is claimed:

1. A method for the preparation of functionalized particles, the method comprising:
    Providing a feedstock comprising
        particles,
        a surface treatment agent reactive with the particles, solvent; and
    Directing the feedstock through a continuous hydrothermal reactor maintained at a temperature sufficient to react the particles with the surface treatment agents to provide the functionalized particles in less than about 4 hours.

2. The method according to claim 1 wherein the temperature of the continuous hydrothermal reactor is above the normal boiling point of the solvent, and wherein the continuous hydrothermal reactor is maintained at an internal pressure greater than 1 atmosphere and sufficient to prevent the solvent from boiling.

3. The method according to claim 2 wherein directing the feedstock through a continuous hydrothermal reactor provides the functionalized particles in less than about 3 hours.

4. The method according to claim 2 wherein directing the feedstock through a continuous hydrothermal reactor provides the functionalized particles in less than about 90 minutes.

5. The method according to claim 2 wherein directing the feedstock through a continuous hydrothermal reactor provides the functionalized particles in less than about 60 minutes.

6. The method according to claim 2 wherein directing the feedstock through a continuous hydrothermal reactor provides the functionalized particles in less than about 30 minutes.

7. The method according to claim 2 wherein directing the feedstock through a continuous hydrothermal reactor provides the functionalized particles in less than about 15 minutes.

8. The method according to claim 1 wherein providing a feedstock comprises creating a sol of particles in solvent and mixing the sol with the surface treatment agent.

9. The method according to claim 8 wherein the solvent is water.

10. The method according to claim 9 wherein the sol is concentrated prior to mixing with the surface treatment agent.

11. The method according to claim 9 wherein the feedstock further comprises water-miscible organic co-solvent selected from the group consisting of 1-methoxy-2-propanol, ethanol, isopropanol, methoxy((ethoxy)ethoxy)ethanol, n-propanol, n-butanol, 2-propoxyethanol, acetone, methyl ethyl ketone, tetrahydrofuran, dimethyl sulfoxide, ethylene glycol, N,N-dimethylacetamide, ethyl acetate, and/or 1-methyl-2-pyrrolidinone, dimethyl formamide, diethylene glycol dimethyl ether, hexamethylphosphoramide, methanol and mixtures of two or more of the foregoing.

12. The method according to claim 1 wherein solvent is an organic solvent.

13. The method according to claim 1 wherein organic solvent is toluene, benzene, ethyl acetate, ethylbenzene, tetrahydrofuran, heptane, hexane 1-methoxy-2-propanol, 2-propoxyethanol, methyl ethyl ketone, methyl isobutyl ketone, N,N-dimethylacetamide, propylene glycol monomethyl ether acetate, ethylene glycol mono-n-propyl ether, ethylene glycol, isopropanol, methanol and mixtures of two or more of the foregoing.

14. The method according to claim 1 wherein providing a feedstock comprises creating a slurry of particles in solvent and mixing the slurry with the surface treatment agent.

15. The method according to claim 14 wherein the solvent is water.

16. The method according to claim 15 wherein the sol is concentrated prior to mixing with the surface treatment agent.

17. The method according to claim 15 wherein the feedstock further comprises water-miscible organic co-solvent selected from the group consisting of 1-methoxy-2-propanol, ethanol, isopropanol, methoxy((ethoxy)ethoxy)ethanol, n-propanol, n-butanol, 2-propoxyethanol, acetone, methyl ethyl ketone, tetrahydrofuran, dimethyl sulfoxide, ethylene glycol, N,N-dimethylacetamide, ethyl acetate, and/or 1-methyl-2-pyrrolidinone, dimethyl formamide, diethylene glycol dimethyl ether, hexamethylphosphoramide, methanol and mixtures of two or more of the foregoing.

18. The method according to claim 1 wherein the surface treatment agent is hydrolyzed prior to its inclusion in the feedstock.

19. The method according to claim 18 wherein the hydrolysis of the surface treatment agent is catalyzed by acetic acid.

20. The method according to claim 19 wherein heat is used to catalyze the pre-hydrolysis of the surface treatment agent.

21. The method according to claim 1 wherein the particles are substantially spherical.

22. The method according to claim 21 wherein the particles have an average thickness of between about 1 nanometer and about 30 microns.

23. The method according to claim 21 wherein the substantially spherical particles have an average thickness of less than about 100 nm.

24. The method according to claim 21 wherein the substantially spherical particles have an average thickness of less than about 50 nm.

25. The method according to claim 21 wherein the substantially spherical particles have an average thickness of less than about 10 nm.

26. The method according to claim 1 wherein the particles comprise substantially cubic configuration.

27. The method according to claim 1 wherein the particles comprise material selected from the group consisting of metals, inorganic oxide, inorganic sulfides, inorganic antimonides, inorganic salts, inorganic nitrides, metal coated particles and combinations of two or more of the foregoing.

28. The method according to claim 27 wherein the metal is selected from the group consisting of gold, platinum, silver, nickel and combinations of two or more of the foregoing.

29. The method according to claim 27 wherein the inorganic oxide is a metal oxide selected from the group consisting of zirconium oxide, aluminum oxide, titanium dioxide, iron oxide, zinc oxide, silicon dioxide, antimony trioxide, boron oxide, boron suboxide, bismuth(III) oxide, copper(I)

oxide, copper(II) oxide, chromium(III) oxide, iron(II) oxide, iron (III) oxide, magnesium oxide, manganese(IV) oxide and combinations of two or more of the foregoing.

30. The method according to claim 27 wherein the inorganic sulfides is selected from the group consisting of copper (I) sulfide, copper(II) sulfide, zinc sulfide, and combinations of two or more of the foregoing.

31. The method according to claim 1 wherein the particles comprise organic pigments.

32. The method according to claim 1 wherein the particles comprise carbon black.

33. The method according to claim 1 wherein the particles comprise glass beads.

34. The method according to claim 1 wherein the particles comprise hollow glass microspheres.

35. The method according to claim 1, wherein the surface treatment agents are selected from the group consisting of [2-(3-cyclohexenyl)ethyl]trimethoxysilane, trimethoxy(7-octen-1-yl) silane, methyl trimethoxy-silane, isooctyl trimethoxy-silane, N-(3-triethoxysilylpropyl)methoxyethoxyethyl carbamate, N-(3-triethoxysilylpropyl)methoxyethoxyethyl carbamate, 3-(methacryloyloxy)propyltrimethoxysilane, allyl trimethoxysilane, 3-acryloxypropyltrimethoxysilane, 3-(methacryloyloxy)propyltriethoxysilane, 3-(methacryloyloxy) propylmethyldimethoxysilane, 3-acryloyloxypropyl)methyldimethoxysilane, -9-3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), betacarboxyethylacrylate, 2-(2-methoxyethoxy)acetic acid, methoxyphenyl acetic acid, and combinations of two or more of the foregoing.

36. The method according to claim 1 wherein the surface treatment agents are selected from the group consisting of $C_1$-$C_{30}$ alkyl amines, $C_1$-$C_{30}$ aryl amines and combinations thereof.

37. The method according to claim 1 wherein the surface treatment agents are selected from the group consisting of $C_1$-$C_{30}$ alkyl thiols, $C_1$-$C_{30}$ aryl thiols and combinations thereof.

38. The method according to claim 1 wherein the surface treatment agents are selected from the group consisting of $C_1$-$C_{30}$ alkyl acids, $C_1$-$C_{30}$ aryl acids and combinations thereof.

39. The method according to claim 1, wherein the tubular reactor is maintained at a temperature of at least about 120° C.

40. The method according to claim 1, wherein the tubular reactor is maintained at a temperature no greater than about 230° C.

\* \* \* \* \*

UNITED STATES PATENT AND TRADEMARK OFFICE
CERTIFICATE OF CORRECTION

PATENT NO. : 8,394,977 B2  
APPLICATION NO. : 12/933741  
DATED : March 12, 2013  
INVENTOR(S) : Grant Fred Tiefenbruck Page 1 of 1

It is certified that error appears in the above-identified patent and that said Letters Patent is hereby corrected as shown below:

Title Page 2, Column 2,
Line 12, Under "Other Publications", delete "Solvent" and insert -- Solvent by --.

In the Specification

Column 22,
Line 63, delete "gallon" and insert -- 5 gallon --.

Signed and Sealed this  
Thirtieth Day of July, 2013

Teresa Stanek Rea  
*Acting Director of the United States Patent and Trademark Office*